UNITED STATES PATENT OFFICE.

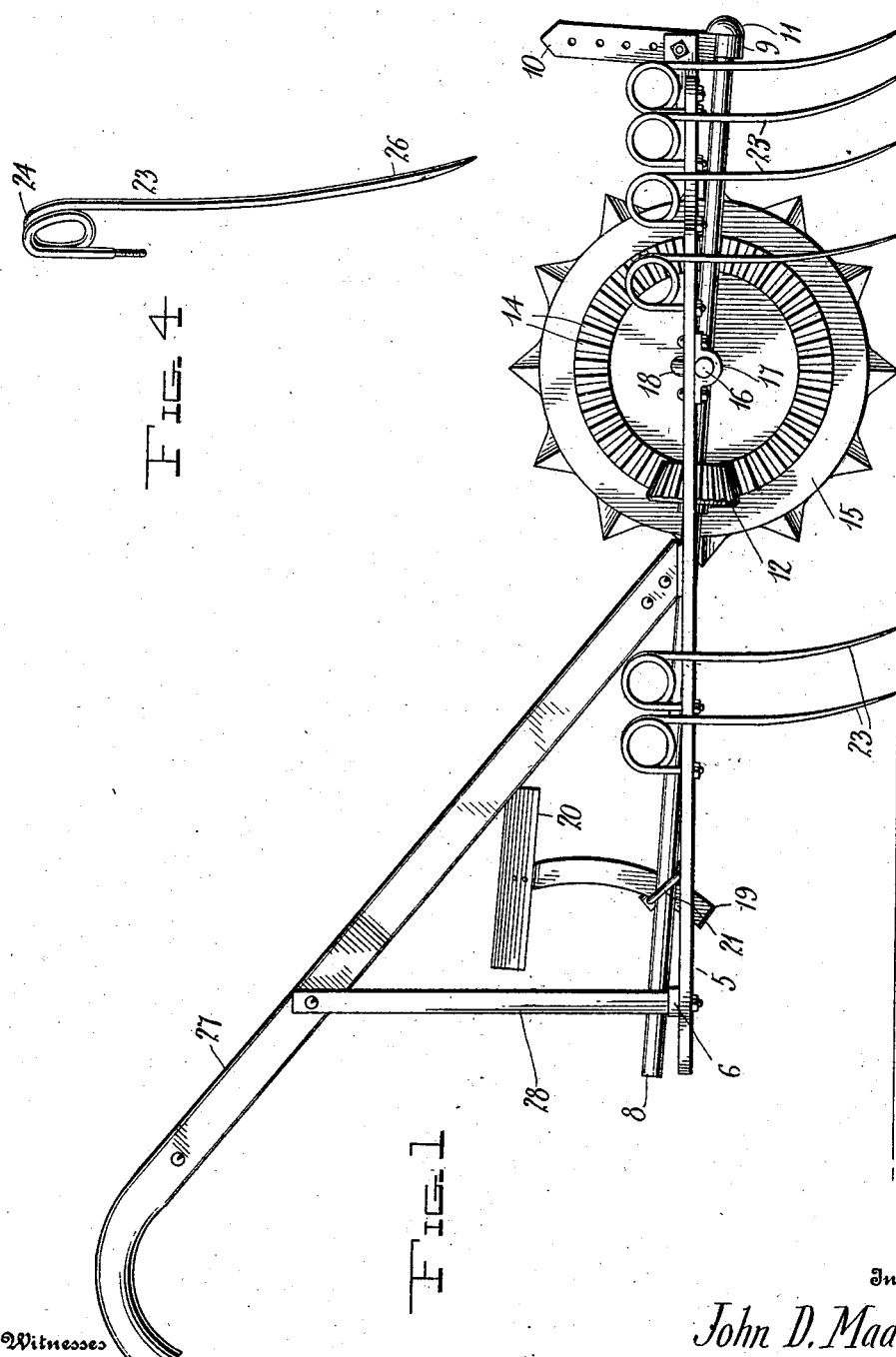

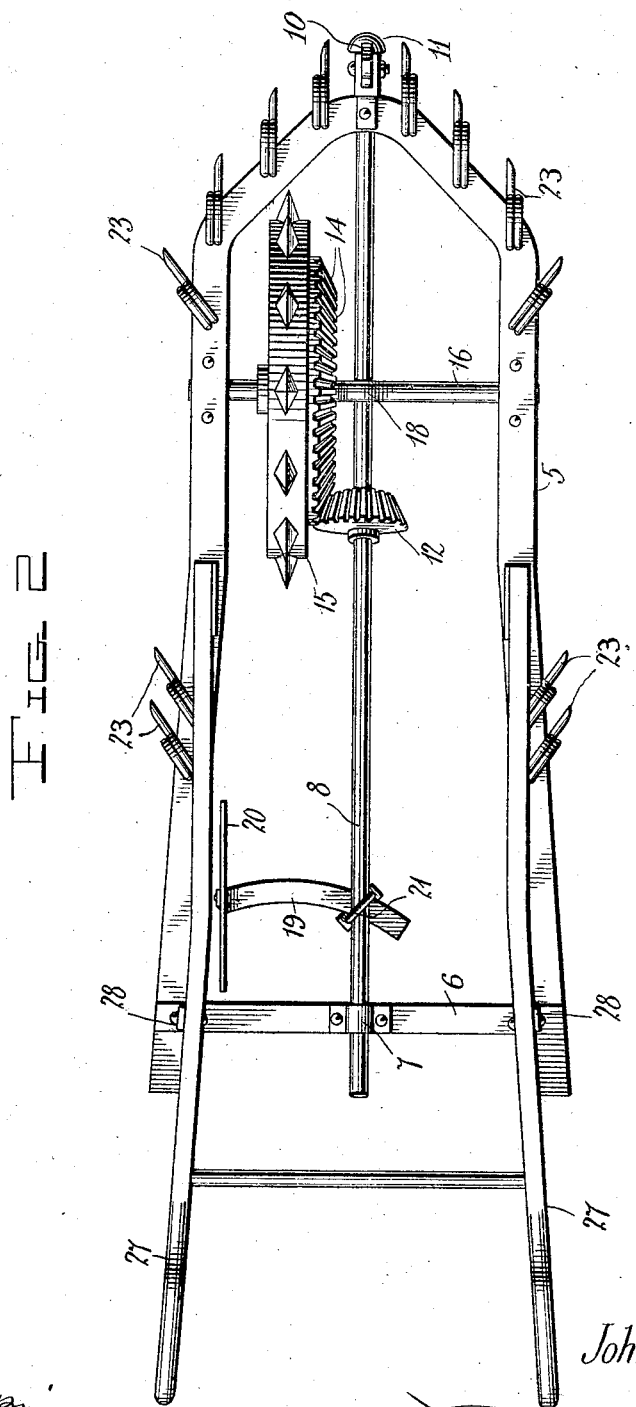

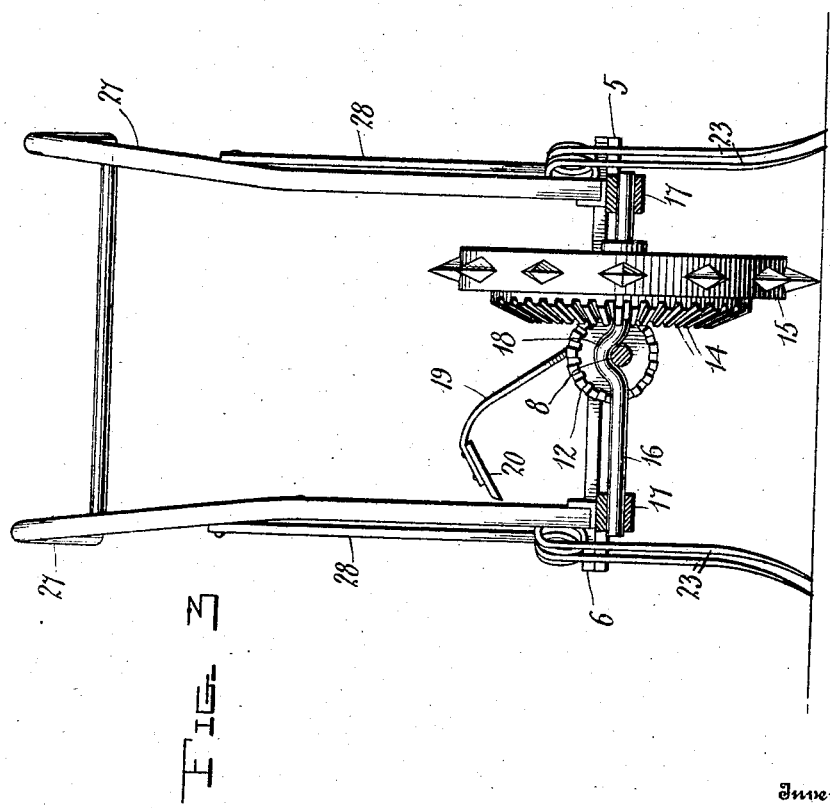

JOHN D. MADDOX, OF CULVERTON, GEORGIA.

COTTON-CHOPPER.

No. 915,456.    Specification of Letters Patent.    Patented March 16, 1909.

Application filed April 28, 1908. Serial No. 429,626.

*To all whom it may concern:*

Be it known that I, JOHN D. MADDOX, a citizen of the United States, residing at Culverton, in the county of Hancock, State of Georgia, have invented certain new and useful Improvements in Cotton-Choppers; and I do hereby declare the following to be a full, clear, and exact description of the invention, such as will enable others skilled in the art to which it appertains to make and use the same.

The present invention has reference to improvements in cotton choppers.

The invention has for its principal object the provision of a chopping implement whose stem is connected with the longitudinal shaft of the machine in such a manner as to permit it to be set at any desired angle thereto, thus changing the angle at which the blade of the implement cuts, the adjustment of the implement also regulating the depth of the cut.

The preferred embodiment of the invention is illustrated in the accompanying drawings, in which corresponding parts are designated by the same reference numerals in the several views.

Of the said drawings Figure 1 is a side elevation of the improved machine. Fig. 2 is a top plan view thereof. Fig. 3 is a transverse section taken on the lines 3—3 of Fig. 2. Fig. 4 is an enlarged detail view of the chopping implement.

Referring more particularly to the drawings, 5 designates generally the U-shaped frame of the machine, the free rear ends of whose legs are connected together by a transverse brace 6, which latter is provided intermediate its ends with a bracket bearing 7. Through said bearing projects the rear end of a longitudinal shaft 8 whose forward end is embraced by a collar 9 formed upon the lower end of a perforated clevis strap 10 which is bolted centrally to the front or bight portion of the frame, the shaft 8 terminating in an enlargement or head 11, which contacts with the collar 9, thus preventing longitudinal movement of the shaft. The rotation of said shaft is effected by means of a pinion 12 secured thereto and meshing with an annular series of teeth 14 formed upon the adjacent face of a ground wheel 15 upon whose periphery is formed a circumscribing series of spurs, the provision of which necessitates a positive rotation of the ground wheel when the machine is drawn across a field. The ground wheel is rotatably mounted upon a transverse shaft 16 journaled in depending brackets 17 secured to the forward portions of the frame legs, the portion of said shaft directly in front of the pinion 12 being provided with an upwardly-extending bend or loop 18, to permit the passage of the shaft 8 therebeneath.

The shaft 8 carries a chopping implement located in the rear of the pinion 12, and comprising a rearwardly curved stem portion 19 and a blade 20 secured thereto. This implement, which is hereinafter termed the hoe, is connected with the shaft 8 by means of a U-shaped clip 21, whose legs straddle the latter and the hoe stem and are threaded at their outer ends, to permit the attachment thereto of tightening nuts 22 which are screwed against the shaft, to hold the hoe in adjusted position. Owing to the fact that the hoe stem is curved, as above stated, it will be apparent that when the tightening nuts are loosened sufficiently, the hoe stem may be moved through the clip to dispose the blade at the desired angle to the shaft 8, and also at the desired distance from the latter. In other words, movement of the blade toward or from the shaft will change the angle at which it is disposed with respect thereto. It will further be apparent that when the nuts are loosened, the hoe stem may be rotated upon its axis, so as to dispose the cutting edge of the blade at different angles.

The forward portion of the frame is provided with a series of harrow teeth 23 which are formed of spring metal and are so disposed with respect to the frame as to project above and below the latter.

The machine is further provided with a pair of rearwardly and upwardly extending handles 27 which are secured at their lower ends to the legs of the frame 5, and are connected centrally with the ends of the brace 6 by means of vertical braces 28.

When the machine is in actual operation, the rotation of the shaft 8, effected by the ground wheel, will revolve the hoe, which latter, when properly adjusted, will chop the vines at regular intervals, the ground in front of the hoe being cleared by the harrow teeth, as will be apparent, the springiness of the teeth permitting them to flex and thus pass by such obstacles as they cannot dislodge.

What is claimed is:

1. In a cotton chopper, the combination of a frame; a shaft carried thereby; a chopping implement having a curved stem arranged for endwise movement across the shaft to vary the angle of the blade of the implement with respect thereto during such movement; means for fastening said implement to said shaft in adjusted position; and means for rotating the shaft.

2. In a cotton chopper, the combination of a frame; a shaft carried thereby; a chopping implement having a curved stem arranged for endwise movement across the shaft to vary the angle of the blade of the implement with respect thereto during such movement; a U-shaped clip having its legs straddling the shaft and the stem of said implement; means carried by the clip for fastening said stem in adjusted position to said shaft; and means for rotating the shaft.

In testimony whereof, I affix my signature, in presence of two witnesses.

JOHN D. MADDOX.

Witnesses:
 ROBERT COLEMAN,
 GEORGE BERRY.